United States Patent [19]

Heath et al.

[11] Patent Number: 4,901,234

[45] Date of Patent: Feb. 13, 1990

[54] COMPUTER SYSTEM HAVING PROGRAMMABLE DMA CONTROL

[75] Inventors: Chester A. Heath; Jorge E. Lenta, both of Boca Raton, Fla.

[73] Assignee: International Business Machines Corporation, Armonk, N.Y.

[21] Appl. No.: 30,786

[22] Filed: Mar. 27, 1987

[51] Int. Cl.$^4$ ................... G06F 13/00; G06F 13/28
[52] U.S. Cl. ..................... 364/200; 364/242.31; 364/241.2; 364/241.4; 364/242.3
[58] Field of Search ....................... 370/95; 364/200 MS File, 900 MS File

[56] References Cited

U.S. PATENT DOCUMENTS

| | | | |
|---|---|---|---|
| 3,243,781 | 3/1966 | Ehrman et al. | 364/200 |
| 3,766,526 | 10/1973 | Buchanan | 364/200 |
| 3,925,766 | 12/1975 | Bardotti et al. | 340/172.5 |
| 4,075,691 | 2/1978 | Davis et al. | 364/200 |
| 4,090,238 | 5/1978 | Russo | 364/200 |
| 4,371,932 | 2/1983 | Dinwiddie et al. | 364/200 |
| 4,437,157 | 3/1984 | Witalka et al. | 364/200 |
| 4,516,199 | 5/1985 | Frieder et al. | 364/200 |
| 4,528,626 | 7/1985 | Dean et al. | 364/200 |
| 4,558,412 | 12/1985 | Inoshita et al. | 364/200 |
| 4,688,166 | 8/1987 | Schneider | 364/200 |

FOREIGN PATENT DOCUMENTS

| | | |
|---|---|---|
| 2039105 | 7/1980 | United Kingdom . |
| 2084768 | 4/1982 | United Kingdom . |
| 2186719 | 8/1987 | United Kingdom . |
| 8002608 | 11/1980 | World Int. Prop. O. . |

OTHER PUBLICATIONS

G. T. Davis, Multiplexing of Interrupt and DMA Request Lines, IBM TDB, vol. 27, No. 5, 1984.
Published Unexamined Patent Application No. 61-131153, DMA Transfer Controlling System, Toshiba Corporation, Nov. 30, 1984 and Translation thereof.
D. Del Corso, Design of Multiprocessor Buses, 1985, pp. 117-163.
P. Civera, et al, Some Examples of Multiprocessor Buses, pp. 165-205.
G. T. Davis, Multiplexing of Interrupt and DMA Request Lines, IBM Technical Disclosure Bulletin, vol. 27, No. 5, 1984.
K. Zilbert, et al., Designing an Advanced DMA Controller for 16-Bit Microcomputers, Siemens Forsch, 1984, pp. 208-214.
D. L. Lochner, et al, Multiplexing a Single Cycle-Steal Interface Among Multiple Devices, IBM Technical Disclosure Bulletin, vol. 27, No. 5, 1984.
Cosma Pabourtsidis and Jean-Louis Ebener, Gespac, G-64 Bus Suits Midrange Industrial μC Applications, EDN, Apr. 18, 1985.
Robert Beims, High Performance Peripherals for M68000 Family, 8079A Mini-Micro Conference Record, Nov. 8-11, 1983.

Primary Examiner—Eddie P. Chan
Assistant Examiner—Rebecca L. Rudolph
Attorney, Agent, or Firm—Anibal Jose Cortina; Philip R. Wadsworth

[57] ABSTRACT

A computer system in which peripherals greater in number than the number of DMA channels provided in the system can all have DMA access. Some of the DMA channels are dedicated to certain ones of the peripherals, while others, termed "programmable" DMA channels, are shared by remaining ones of the peripherals. Each peripheral having DMA access has a channel priority value. When a peripheral wants DMA access, it transmits its channel priority value onto an arbitration bus. The winning channel priority value is then compared with prestored DMA channel assignment values. If the comparison is successful, the corresponding peripheral is given a DMA channel corresponding to the DMA Channel assignment value with which the comparison was successful.

8 Claims, 5 Drawing Sheets

COMPUTER SYSTEM HAVING PROGRAMMABLE DMA CONTROL

DESCRIPTION

1. Technical Field

The present invention relates to a DMA (Direct Memory Access) controller for use in a microcomputer or minicomputer system. More particularly, the invention provides a DMA controller with which peripheral devices in a number greater than the number of physical DMA channels provided in the system can perform DMA data transfers.

2. Prior Art

Many present-day computer systems employ DMA channels to allow peripheral devices to transfer data, primarily to and from the main memory, without going through the CPU (Central Processing Unit). Bypassing the CPU of course has the advantage of increased data transfer rates and improved overall system efficiency because the CPU is free to perform other tasks during the data transfer.

The most common practice to date has been to provide one physical DMA channel for every peripheral unit that is allowed DMA access. An example of a computer system which employs such an arrangement is the IBM PC computer.

However, the number of peripheral devices which a user may attach to his or her computer system have been increasing and is expected to continue to do so. For instance, lately there have become available optical disk readers, additional communications devices, hard files, tape backup devices, high speed printers, etc., all of which can make advantageous use of DMA access.

On the other hand, adding further physical DMA channels is costly of system hardware, including IC count, board space, and bus space. It has been considered to share DMA channels among peripheral devices with the restriction of mutually exclusive operation. Sharing of DMA channels is employed in, for instance, the IBM XT and AT computer systems. These schemes though require extensive modifications to the operating system as additional subroutines are required to prevent the peripheral devices associated with each DMA channel from operating simultaneously. A significant performance burden is also created when file controllers are not sufficiently "intelligent" to allow overlapped seek operations. The problem is compounded in certain situations, for example when a LAN (Local Area Network) feature and a file controller share the same DMA level and a LAN file server routine must trade back and forth between the two devices.

U.S. Pat. No. 3,925.766 to Bardotti et al. discloses a computer system wherein peripheral devices are assigned priority levels, and requests for access to communicate with a memory are selected according to the priority levels. The priority level assignments can be changed according to the causes for which the request signals are generated or the particular load conditions of the central processor. No DMA paths are provided, however.

In U.S. Pat. No. 4,400,771 to Suzuki et al. there is shown a multi-processor system in which each of the multiple processors can access a single memory. A programmable register circuit stores priority information designating a memory access grade priority for each of the processors. The priority information can be changed manually, by an external circuit, or by at least one of the processors. The Suzuki et al. patent does not though employ DMA access to a memory from plural peripheral devices.

U.S. Pat. No. 4,257,095 to Nadir is of interest in its teachings regarding bus arbitration techniques.

The following United States patents are mentioned for general background teachings related to computer systems employing DMA controllers: U.S. Pat. No. 4,371,932 to Dinwiddie, Jr., et al., U.S. Pat. No. 4,419,728 to Larson, U.S. Pat. No. 4,538,224 to Peterson, U.S. Pat. No. 4,556,962 to Brewer et al., and U.S. Pat. No. 4,584,703 to Hallberg.

OBJECTS OF THE INVENTION

Accordingly, it is an object of the present invention to provide a computer system employing a DMA controller wherein peripheral devices in a number greater than the number of physical DMA channels provided in the system can share the DMA channels without encountering the problems of the prior art approaches discussed above.

It is a further object of the invention to provide such a computer system in which each peripheral device allowed DMA access is assigned its own DMA access arbitration level.

It is yet a further object of the invention to provide such a computer system in which the assignment of DMA channels to peripheral devices can readily be controlled in software without making extensive modifications to the operating system.

SUMMARY OF THE INVENTION

In accordance with the above and other objects of the present invention there is provided a computer system including a plurality of peripherals requiring DMA access, the number of peripherals being greater than the number of DMA channels provided in the system. Some of the peripherals are allotted fixed, dedicated ones of the DMA channels, while others of the peripherals share the remaining DMA channels. The shared remaining channels are herein called "programmable" DMA channels. These additional DMA channels are nonphysical, and hence may be term "virtual" DMA channels to distinguish them from the physical or "real" DMA channels.

Each of the peripherals is given a channel priority assignment. An arbitration circuit stores DMA channel assignment values, one for each of the DMA channels provided in the system. For each peripheral having a dedicated DMA channel, a fixed DMA channel assignment value is stored, while for the remaining peripherals, which share the programmable DMA channels, a programmable DMA channel assignment value is stored.

When a peripheral wants DMA access, it transmits its channel priority value onto an arbitration bus. The highest channel priority value "wins" on the arbitration bus. The winning channel priority value is compared with the fixed and programmable DMA channel assignment values. If the channel priority value successfully compares with one of the stored fixed or programmable DMA channel assignment values, it is granted access to the corresponding DMA channel.

DETAILED DESCRIPTION OF THE PREFERRED EMBODIMENT OF THE INVENTION

Figure 1:
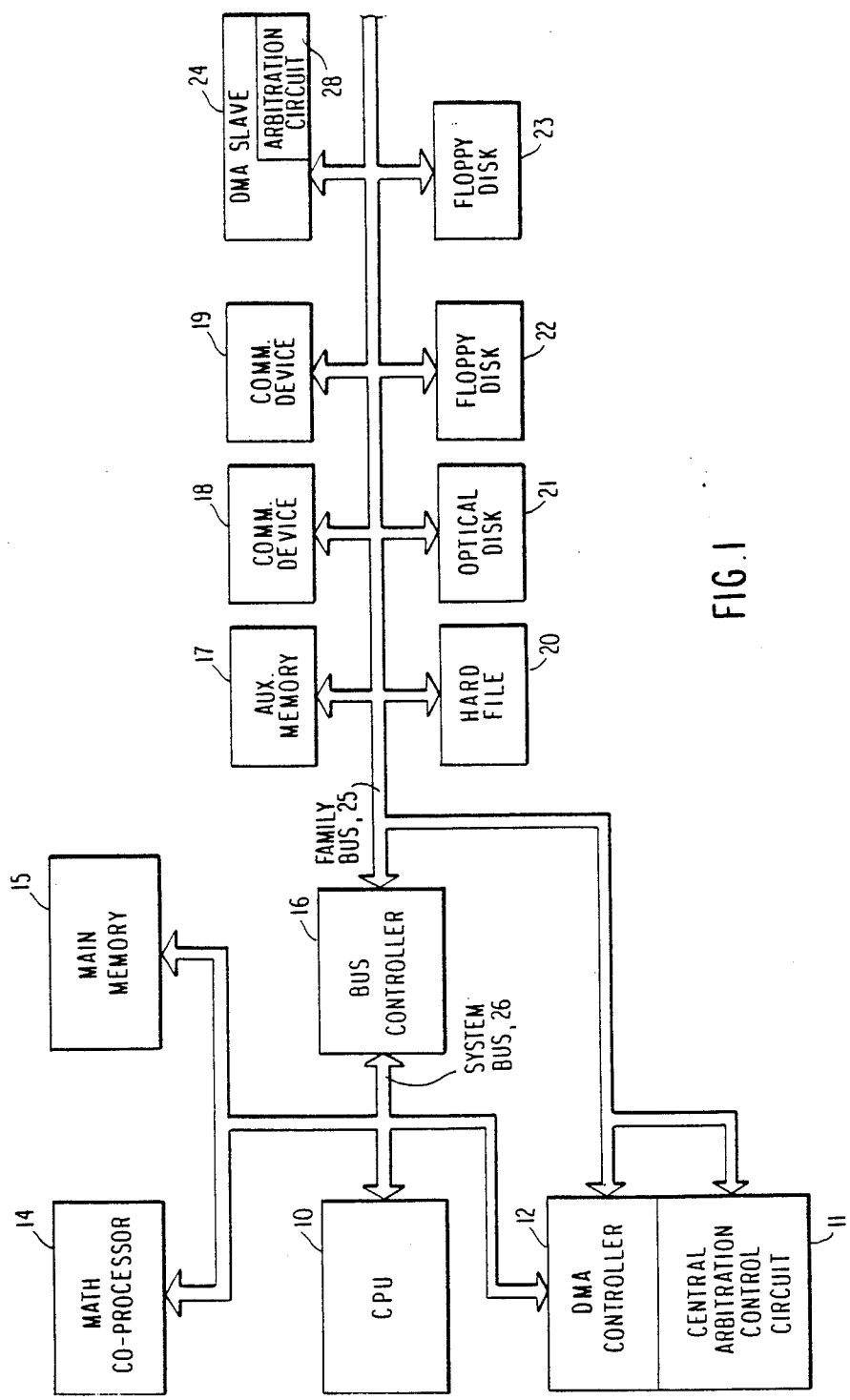
FIG. 1 is a block diagram showing a computer system employing the invention.

Referring first to FIG. 1 of the accompanying drawings, there is shown a block diagram of a computer system in which the present invention is used to advantage.

A CPU communicates with a main memory 15, bus controller 16 and math co-processor 14 via a system bus 26. Communication between the CPU and its associated peripheral devices is through a bus controller 16, the latter being coupled to the peripheral devices through a family bus 25. In the present example, the peripheral devices include an auxiliary memory 17, two communications devices 18 and 19, a hard file 20, an optical disk 21, and two floppy disks 23. Other peripherals can of course be used as well as system needs dictate. The peripheral devices are represented generically by DMA slave 24.

A DMA controller 12 is provided to allow at least selected ones of the peripheral devices direct memory access. For this purpose, as will be explained in more detail below, the family bus, or at least a portion thereof, is branched to the DMA controller 12. Each peripheral allowed DMA access is provided with an arbitration circuit 24, and each peripheral having an arbitration circuit is assigned an arbitration (priority) level. Again as will be explained in more detail later, a central arbitration control circuit 11 is associated with the DMA controller to arbitrate among peripheral devices concurrently requesting DMA access and to inform the DMA controller of which peripheral is to have access.

In the computer system embodying the invention, the number of peripheral devices to be allowed DMA access is greater than the number of physical DMA channels provided in the system. In accordance with the present invention, some of these devices are allotted their own dedicated DMA channel, while others share the remaining DMA channels. On the shared (programmable) channels, access is in order of preassigned priority.

In the present example, it is assumed that there are eight physical DMA channels, designated 0 through 7. It is further assumed that channels 0 and 4 are shared, and that remaining channels 1-3 and 5-7 are dedicated to individual peripherals.

Figure 2:
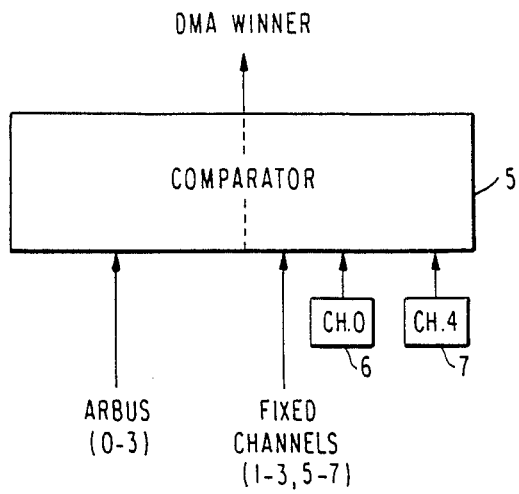
FIG. 2 is a conceptual diagram used to explain the operation of the present invention.

Referring now to FIG. 2, which is a conceptual drawing used to explain the principles of the present invention, a comparator is provided with two sets of inputs. One set is composed of four lines from a bus ARBUS (ARbitration Bus). The value on the ARBUS is indicative of the peripheral currently requesting a DMA channel having the highest arbitration (priority) level. If that peripheral is one of those having one of the dedicated channels 1-3 or 5-7, access is granted directly to that channel. On the other hand, if the peripheral is one of those having to share a programmable DMA channel (channels 0 and 4), access is granted only if its priority level corresponds to one of the values preset in registers 6 and 7. This operation will be explained in more detail below with reference to FIGS. 3-6.

Figure 3:
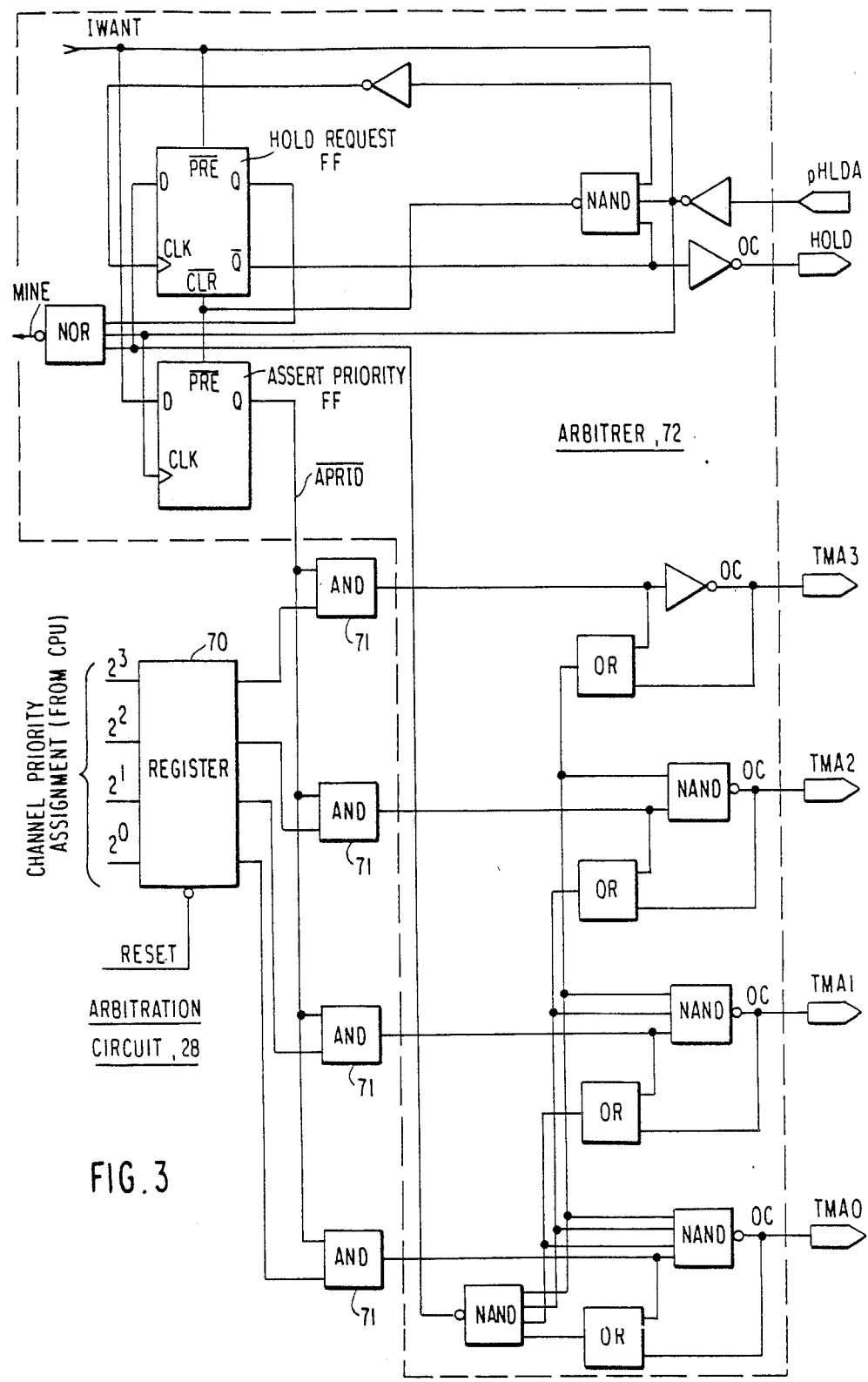
FIG. 3 is a logic diagram depicting in detail an arbitration circuit provided in peripheral devices of the computer system of FIG. 1.

FIG. 3 is a logic diagram of one of the arbitration circuits 28 used in each of the peripherals allowed DMA access. The arbitration level assigned to the peripheral is set in a register 70, hereinafter referred to as the channel priority assignment register. This may be done using any of a number of well-known techniques. Preferably, the CPU addresses the peripheral through a preassigned port so that the arbitration level can be set through software. This may be done through the BIOS (Basic Input-Output System), POST (Power-On Self Test) at reset, the operating system, or the application program as desired. Otherwise, it is possible to input the channel priority assignment value with hardware switches.

The actual arbitration circuitry is implemented with an arbiter 72. This circuit, including the various signals indicated in FIG. 3, is disclosed and discussed in detail in American National Standard/IEEE Standard No. ANSI/IEEE Std 696-1983, published by the Institute of Electrical and Electronics Engineers, Inc., June 13, 1983. In general, each device incorporated in the arbitration scheme is provided with such a circuit, and the circuits are connected together via an ARBUS. The ARBUS in the example shown has four data lines TMA0-TMA3, allowing for 16 different arbitration levels. Any desired number though can be used. During an arbitration time period designated by the control signals pHLDA and HOLD, all devices desiring to gain control over the bus (those having the IWANT signal set to the high ("1") state) transmit their arbitration (priority) levels onto the ARBUS. This occurs in the example of FIG. 3 when the signal /APRIO ("/" indicating a "low-truth" signal) goes to the low ("0") state. The value then held in the register 70 is gated through the AND gates 71 to the arbiter 72 and thence onto the ARBUS lines TMA0-TMA3. At the end of the arbitration period, the value on the ARBUS lines TMA0-TMA3 will be the value of the arbitration level of the device having the highest level. The waveforms of the various signals mentioned here are shown in detail in the referenced ANSI/IEEE standard.

Figure 4:
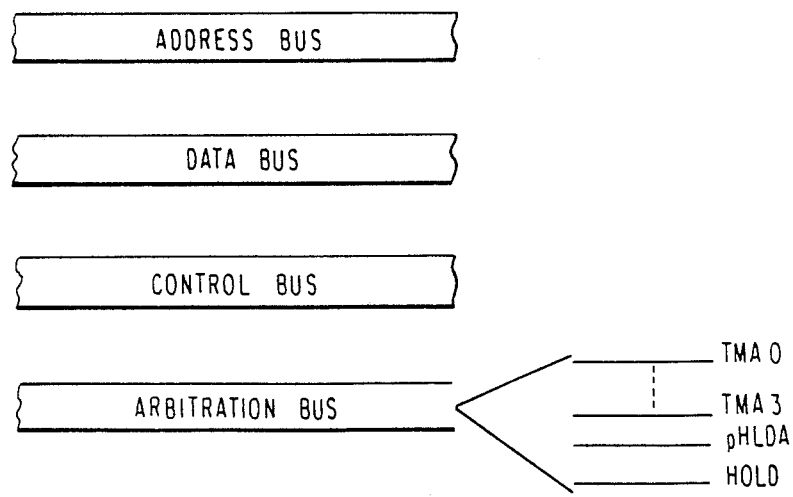
FIG. 4 is a diagram showing details of one of the buses in the computer system of FIG. 1.

In the preferred embodiment under discussion, the ARBUS forms a part of the family bus 25 coupling the peripherals to the bus controller 16 and thence to the CPU 10. The relationship of the ARBUS to the overall family bus 25 is depicted in FIG. 4.

Figure 5:
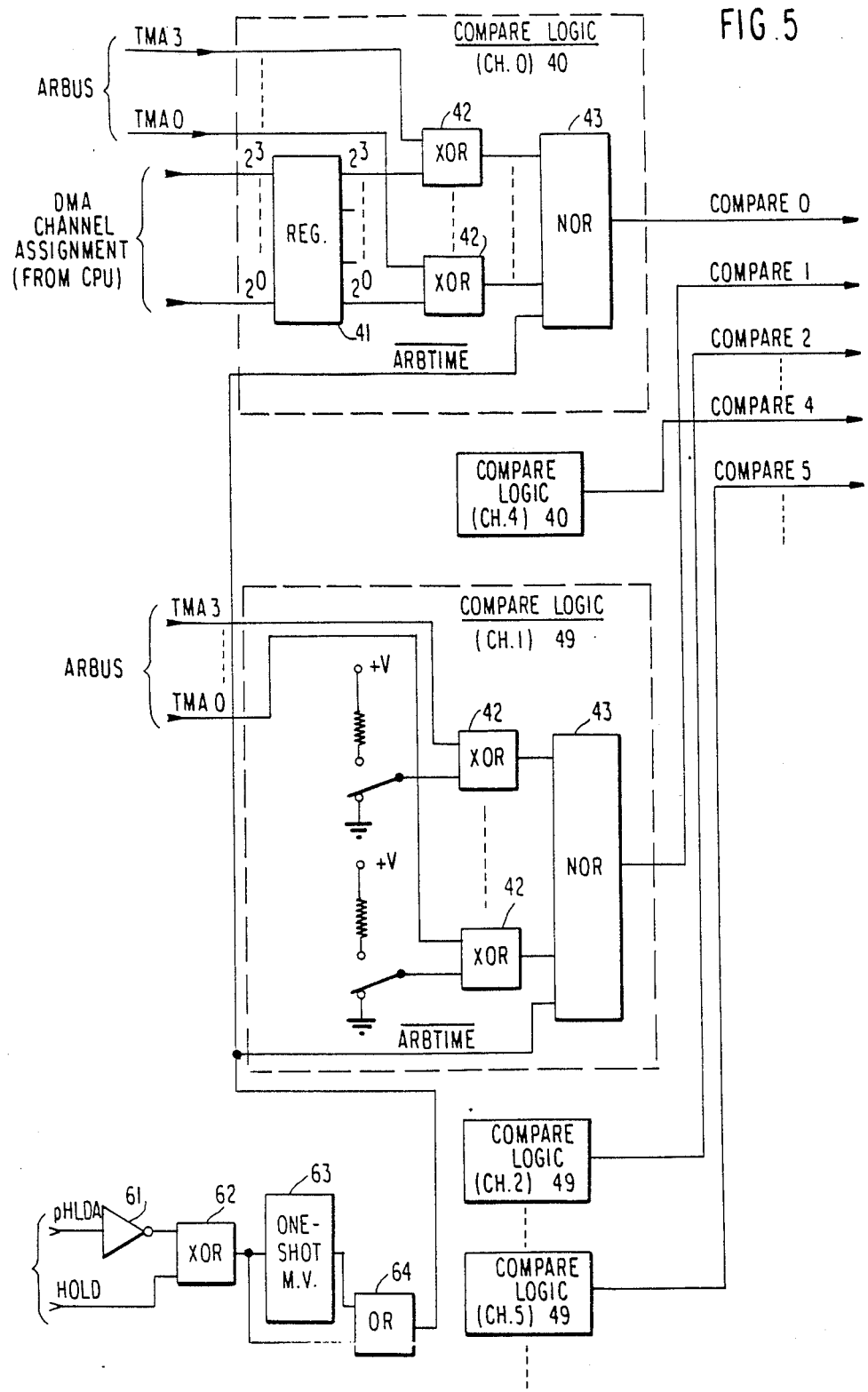
FIG. 5 is a detailed logic diagram of a central arbitration control circuit employed in the computer system of the invention.
Figure 6:
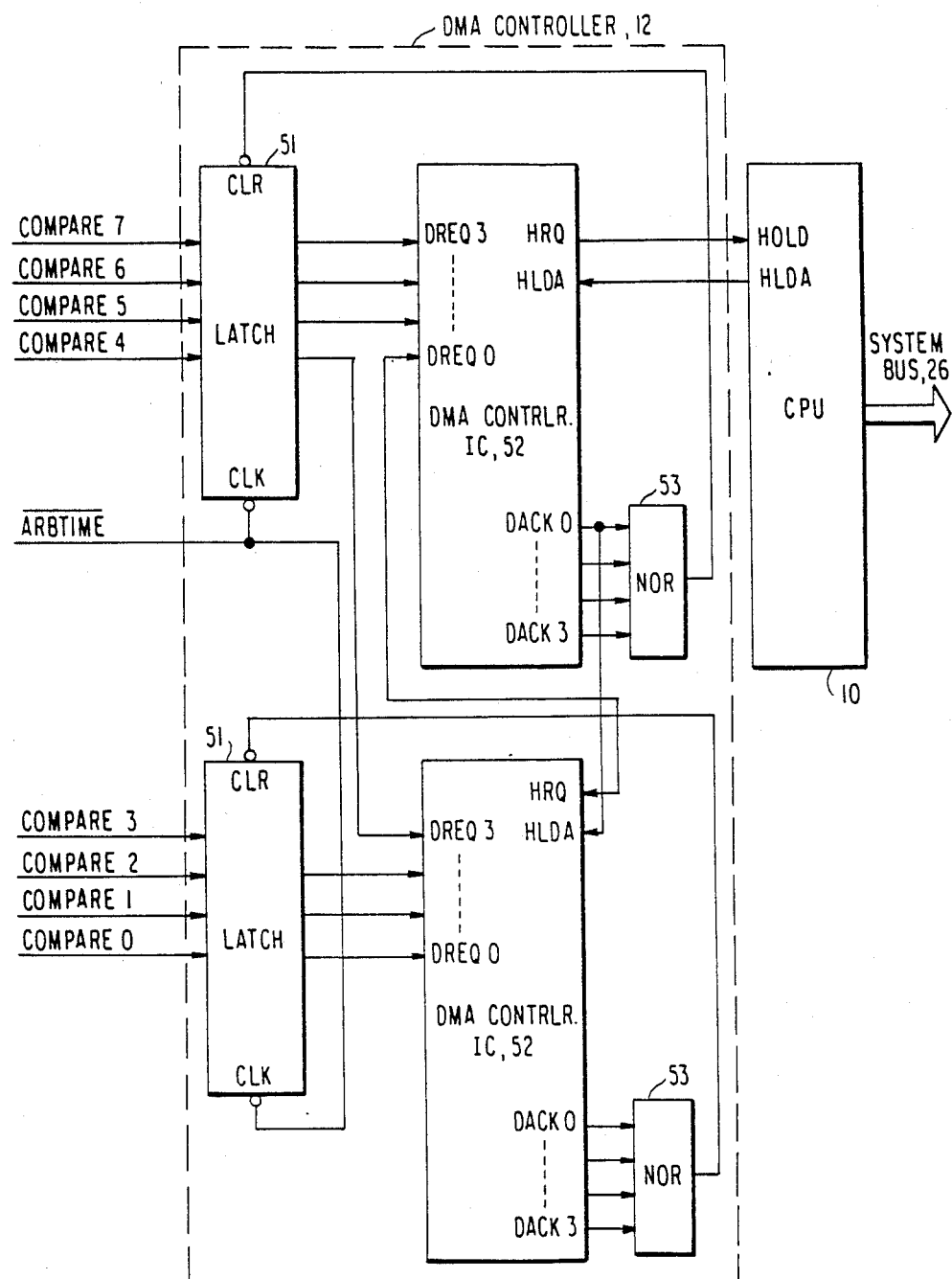
FIG. 6 is a detailed logic diagram of a DMA control circuit used in the invention.

The details of the central arbitration control circuit 11 and the DMA controller 12 are shown in FIGS. 5 and 6, respectively, to which reference is now made.

As indicated in FIG. 5, the signals HOLD and pHLDA from the ARBUS are used to generate a signal /ARBTIME /ARBTIME is in the "0" state during the time when arbitration is to take place among the peripheral devices competing for a DMA channel. It remains in the "0" state long enough for the signals on the ARBUS to have reached steady-state conditions, that is, sufficiently long for the arbitration to be completed. To generate /ARBTIME, pHLDA is inverted by an inverter 61, then applied together with HOLD to respective inputs of an EXCLUSIVE-OR gate 62. A one-shot multivibrator 63, having an output pulse period longer than the arbitration time on the ARBUS, is triggered by the leading edge of the output pulse from the EXCLUSIVE-OR gate 62. The output of the one-shot multivibrator is ORed with the output of the EXCLUSIVE-OR gate 62 by an OR gate 64 to thus produce /ARBTIME. Other arrangements are of course possible for generating /ARBTIME. In one approach, DMA request signals from each device are ORed together and the ORed output applied to generate a pulse signal of appropriate length. The basic requirement in any case is to set /ARBTIME to the "0" state to define the time periods when arbitration is taking place on the ARBUS.

One compare logic 40 is provided for each of the programmable physical DMA channels in the system, and one compare logic 49 is provided for each of the fixed channels. Each compare logic 40 for the programmable DMA channels (channels 0 and 4 in the present example) includes a register 41, referred to as a DMA channel assignment register, which is loaded by the CPU with a DMA channel assignment. The compare logics 49, namely, those for the fixed channels, are identical to the compare logics 40, except that the register 40 is replaced by a set of switches with which the channel assignment is manually set. Only one each of the compare logics 40 and 49 are shown in detail since the other ones of the compare logics 40 and 49 are identical and their input signals are the same.

The outputs from the registers 41 for the programmable channels (compare logics 40) and the outputs of the switches for the fixed channels (compare logics 49) are compared with the signals TMA0-TMA3 by a set of exclusive-OR gates 42, the outputs of which are applied to inputs of a NOR gate 43. If a match is present between the channel assignment and the value represented by TMA0-TMA3 at the end of the arbitration period, that is, if the corresponding signals are then in the identical states, the output from the NOR gate 43 (COMPARE 0-COMPARE 7) will be in the "1" state. Of course, only one NOR gate 43 at a time can have an active output.

With reference now to FIG. 6, at the end of the arbitration time when /ARBTIME goes back to the "1" level, a "1" from the one of the signals COMPARE 0-COMPARE 7 in the "1" state will be set in one of the two latches 51 of the DMA controller 12. The other ones of COMPARE 0-COMPARE 7 will be in the "0"state, and hence a "0" will be set in the corresponding positions in the latches 51.

The outputs of the latches 51 are applied to corresponding DMA request inputs (DREQ0-DREQ3) of two cascade-connected DMA controller IC's 52. In the embodiment under discussion, the IC's 52 are each a type 8237 programmable DMA controller manufactured by Intel Corporation. The DMA controller IC's 52 are cascade connected using NOR gates 53. The CPU may be any of the Intel iAPX 86 series of microprocessors, such as the 8088, 8086 or 80286. For details of the connections between the two DMA controller IC's and the CPU, reference may be made to the 1985 Intel Microsystem Components Handbook, pages 2-57 to 2-71.

Accordingly, for a peripheral having a dedicated DMA channel assignment, once the peripheral wins on the ARBUS, it is guaranteed immediate use of a DMA channel. For a peripheral sharing one of the DMA channels, when it wins on the ARBUS, it will gain the immediate use of a DMA channel only if its channel priority assignment value, as held in its channel priority assignment register 70, matches one of the DMA channel assignment values set in one of the two registers 41. Of course, the BIOS, operating system, or applications program can continually reprogram the channel assignment values held in the DMA channel assignment registers 41 of the two programmable channel compare logics 40 to assure that all peripherals needing access eventually are given the use of a DMA channel. Many different programming schemes can be implemented to control the values stored in the DMA channel assignment registers 41 and the channel priority assignment registers 70 of the arbitration circuits depending upon the application at hand. In a simple example, the values set in the priority assignment registers 70 are fixed and the values set in the DMA channel assignment registers 41 are rotated among at least some of the values in the priority assignment registers 70 to thus give each peripheral associated with one of the programmable DMA channels a chance to gain the use of a DMA channel. If "intelligent" peripherals are employed having their own controller, more complex schemes may be implemented. For example, when a peripheral assigned to a programmable DMA channel wishes access, the peripheral can query the operating system or BIOS as to the availability of one of the programmable channels. If a channel is available, its number can then be set in the registers 70 and 41 to guarantee access. However, since the selection of the programming scheme is beyond the scope of the present invention and in the province of the user, further examples will not be discussed here.

Other applications of the invention are also contemplated. For example, programmable DMA channels provided by the use of the invention can be used as redundant back-up channels for ones of the dedicated channels, thereby providing improved system reliability.

It is to be understood that while modifications can be made to the structures and teachings of the present invention as described above, such modifications fall within the spirit and scope of the present invention as specified in the claims appended hereto

Having thus described our invention, what we claim as new, and desire to secure by Letters Patent is:

1. A computer system comprising:
   means for providing a plurality of DMA channels;
   a plurality of peripheral devices comprising means for requesting DMA access;
   means for assigning at least one of said peripheral devices to a respective dedicated one of said DMA channels for DMA access and for assigning the remainder of said peripheral devices to share the remainder of said DMA channels for DMA access; and wherein said assigning means comprises means for comparing channel priority assignment values of each one of said remainder of said peripheral devices requesting DMA access, with a predetermined programmed set of DMA channel assignment values, and means for granting one of said remainder of said peripheral devices access to a DMA channel when said one of said remainder of said peripheral devices has a channel priority assignment value corresponding to one of said predetermined programmed DMA channel assignment values.

2. The computer system of claim 1, wherein said comparing means comprises means for storing said predetermined set of channel assignment values, and means for simultaneously comparing said channel priority assignment value for one of said peripherals requesting DMA access with said set of channel assignment values.

3. The computer system of claim 2, further comprising means for changing said channel assignment values for said remainder of said DMA channels.

4. A computer system comprising:
a plurality of peripheral devices requiring DMA access;
arbitration bus means;
means in each of said peripheral devices for requesting DMA access by placing on said arbitration bus means a channel priority assignment value for the respective peripheral device;
means for storing first and second sets of DMA channel assignment values, said DMA channel assignment values being fewer in number than the number of said peripherals and being equal in number to the number of DMA channels provided in said computer system, said first set of said DMA channel assignment values being fixed and corresponding to fixed predetermined ones of said channel priority assignment values, said second set DMA assignment values being programmable and allocatable among the remaining ones of said channel priority assignment values;
means for comparing priority assignment values received on said arbitration bus means with said set of stored DMA channel assignment values; and
means for granting DMA access to each of said peripherals whose priority assignment value is found by said comparing means to be equal to one of said DMA channel assignment values of said first and second sets.

5. The computer system of claim 4, wherein said storing means comprises for each of said programmable DMA channel assignment values a register programmable by a central processing unit of said computer system.

6. The computer system of claim 5, wherein said storing means comprises, for each of said fixed DMA channel assignment values, means for fixedly inputting the respective DMA channel assignment value.

7. A method for controlling DMA access in a computer system, comprising the steps of:
assigning to each of a plurality of peripherals requiring DMA access a channel priority assignment value;
fixedly storing a first set of DMA channel assignment values for DMA channels dedicated to respective peripheral devices, and programmably storing a second set of DMA channel assignment values for DMA channels shared among a plurality of peripheral devices;
transmitting onto a bus from each of said peripherals requesting DMA access its channel priority assignment value;
arbitrating on said bus to determine a highest channel priority assignment value of peripherals concurrently requesting DMA access;
comparing said highest channel priority assignment value with said first and second sets of DMA channels assignment values; and
granting access to a respective DMA channel to the corresponding peripheral device when said highest channel priority assignment value is equal to one of said DMA channel assignment values contained in said first and second sets.

8. The method of claim 7, wherein said step of comparing comprises simultaneously comparing said highest channel priority assignment value with said first and second sets.

* * * * *